(12) United States Patent
Kim et al.

(10) Patent No.: US 11,355,761 B2
(45) Date of Patent: Jun. 7, 2022

(54) POLYELEMENTAL CATALYST STRUCTURES FOR FUEL CELLS

(71) Applicant: Robert Bosch GmbH, Stuttgart (DE)

(72) Inventors: Soo Kim, Cambridge, MA (US); Jonathan Mailoa, Cambridge, MA (US); Nathan Craig, Santa Clara, CA (US); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 16/731,478

(22) Filed: Dec. 31, 2019

(65) Prior Publication Data
US 2021/0202956 A1 Jul. 1, 2021

(51) Int. Cl.
*H01M 4/92* (2006.01)
*H01M 8/1004* (2016.01)
*H01M 4/86* (2006.01)

(52) U.S. Cl.
CPC ......... *H01M 4/921* (2013.01); *H01M 4/8652* (2013.01); *H01M 4/8657* (2013.01); *H01M 8/1004* (2013.01)

(58) Field of Classification Search
None
See application file for complete search history.

(56) References Cited

U.S. PATENT DOCUMENTS

| 5,024,905 A | 6/1991 | Itoh et al. |
| 6,916,764 B2 | 7/2005 | Choi et al. |
| (Continued) | | |

FOREIGN PATENT DOCUMENTS

WO 2010050964 A1 5/2010

OTHER PUBLICATIONS

Chen et al., "Interface and heterostructure design in polyelemental nanoparticles", Science 363 (6430), 959-964, Mar. 1, 2019, 7 pages.

*Primary Examiner* — Christopher P Domone
(74) *Attorney, Agent, or Firm* — Brooks Kushman P.C.

(57) ABSTRACT

A polyelemental catalyst structure. The structure includes a region formed of a first metal material, a first core region formed of a second metal material, and a second core region formed of a third metal material. The first core region has interfacial contact with the region. The second core region has interfacial contact with the first core region. The polyelemental catalyst structure includes platinum (Pt), a first metal $M_I$, a second metal $M_{II}$ and a third metal $M_{III}$. The first metal $M_I$ is configured to enhance catalytic activity of Pt. The second metal $M_{II}$ is configured to enhance stability of the polyelemental catalyst structure. The third metal $M_{III}$ is configured to enhance covalent bonding between Pt, the first metal $M_I$, the second metal $M_{II}$ and/or the third metal $M_{III}$.

20 Claims, 9 Drawing Sheets

(56) References Cited

U.S. PATENT DOCUMENTS

2011/0091787 A1* 4/2011 McGrath ................ C22C 27/06
  429/479
2020/0067105 A1* 2/2020 You .................... H01M 4/9016

* cited by examiner

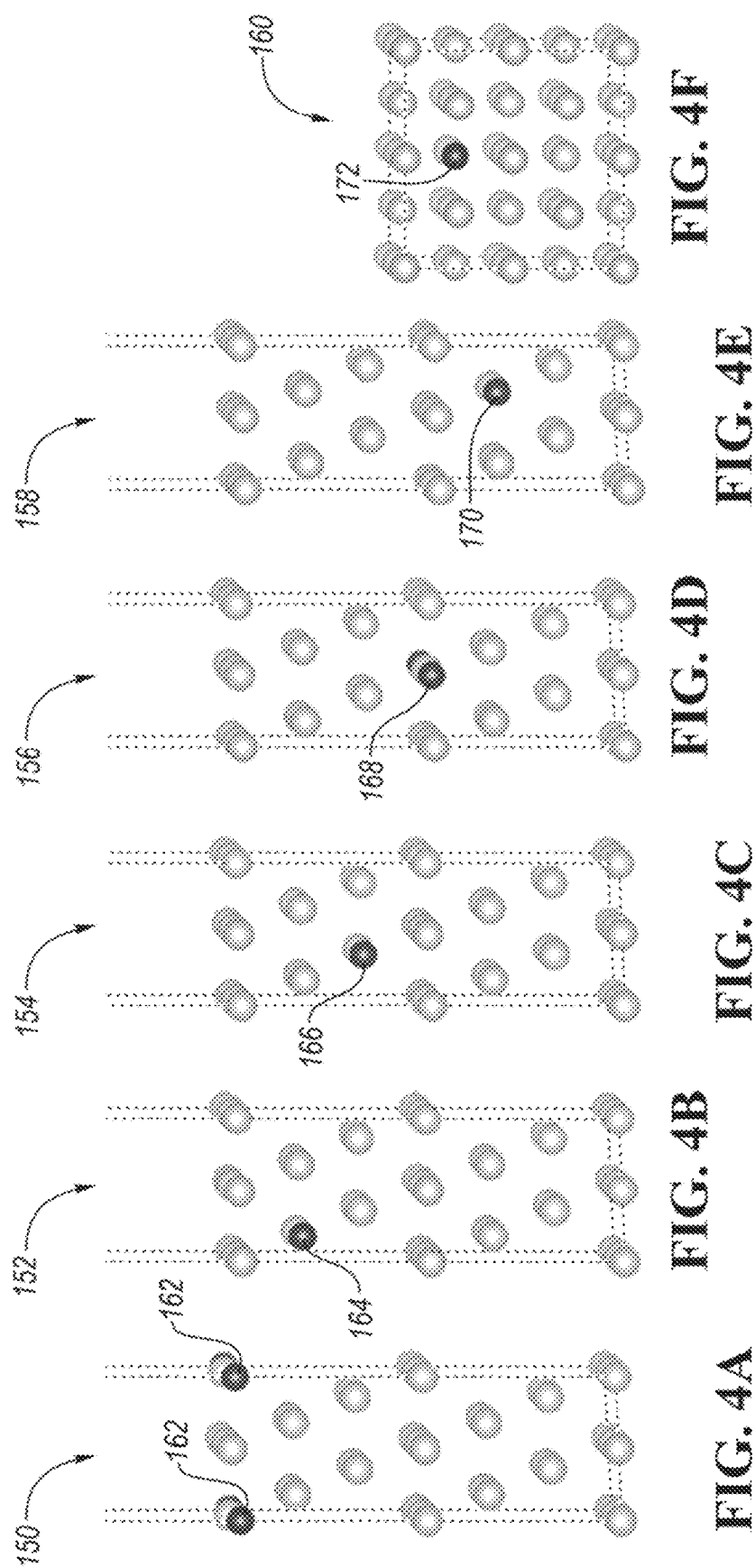

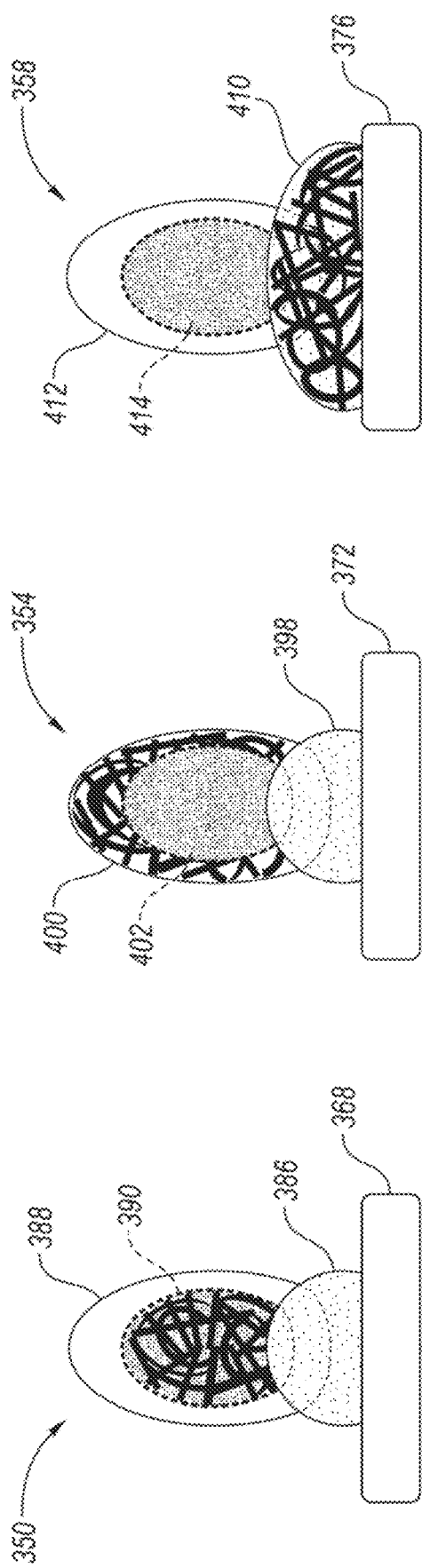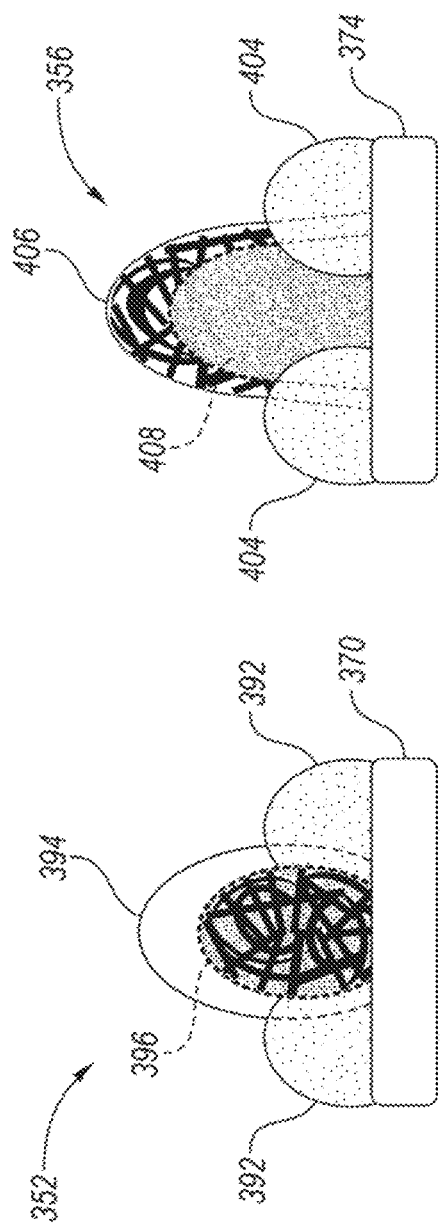

POLYELEMENTAL CATALYST STRUCTURES FOR FUEL CELLS

TECHNICAL FIELD

The present disclosure relates to a polyelemental catalyst structures for fuel cells, for example, polymer electrolyte membrane fuel cells.

BACKGROUND

Fuel cells have shown promise as an alternative power source for vehicles and other transportation applications. Fuel cells operate with a renewable energy carrier, such as, hydrogen. Fuel cells also operate without toxic emissions or greenhouse gases. One of the current limitations of widespread adoption and use of this clean and sustainable technology is the relatively expensive cost of the fuel cell stack. A catalyst material (e.g. platinum catalyst material) is included in the catalyst layer of both the anode and the cathode of the fuel cell. The catalyst material is one of the most expensive components of the fuel cell stack.

SUMMARY

According to one embodiment, a polyelemental catalyst structure is disclosed. The polyelemental catalyst structure includes a region formed of a first metal material, a first core region formed of a second metal material, and a second core region formed of a third metal material. The first core region has an interfacial contact with the region. The second core region has an interfacial contact with the first core region. The polyelemental catalyst structure includes platinum (Pt), a first metal $M_I$, a second metal $M_{II}$ and a third metal $M_{III}$. The first metal $M_I$ is configured to enhance catalytic activity of Pt. The second metal $M_{II}$ is configured to enhance stability of the polyelemental catalyst structure. The third metal $M_{III}$ is configured to enhance covalent bonding between Pt, the first metal $M_I$, the second metal $M_{II}$ and/or the third metal $M_{III}$.

According to another embodiment, a polyelemental catalyst structure is disclosed. The polyelemental catalyst structure includes a region formed of a first metal material, a first core region formed of Pt, and a second core region formed of Co. The first core region has an interfacial contact with the region. The second core region has an interfacial contact with the first core region.

In yet another embodiment, a fuel cell is disclosed. The fuel cell includes a polymer electrolyte membrane (PEM). The fuel cell also includes first and second electrode catalyst layers including first and second supports and first and second catalyst materials, respectively. The PEM is situated between the first and second electrode catalyst layers. The first and/or second catalyst materials include a plurality of polyelemental catalyst particles. Each of the plurality of polyelemental catalyst particles includes a region formed of a first metal material, a first core region formed of a second metal material, and a second core region formed of a third metal material. The first core region has an interfacial contact with the region. The second core region has an interfacial contact with the first core region. The polyelemental catalyst structure includes platinum (Pt), a first metal $M_1$, a second metal $M_{II}$ and a third metal $M_{III}$. The first metal $M_I$ is configured to enhance catalytic activity of Pt. The second metal $M_{II}$ is configured to enhance stability of the polyelemental catalyst structure. The third metal $M_{III}$ is configured to enhance covalent bonding between Pt, the first metal $M_I$, the second metal $M_{II}$ and/or the third metal $M_{III}$.

BRIEF DESCRIPTION OF THE DRAWINGS

FIGS. 4A through 4F depict schematic views of Co-doped Pt catalyst models for fuel cells.

FIGS. 8A through 8I depict schematic, side views of polyelemental catalyst structures configured to be used in electrode catalyst layers of fuel cells according to one or more embodiments.

DETAILED DESCRIPTION

Figure 1:
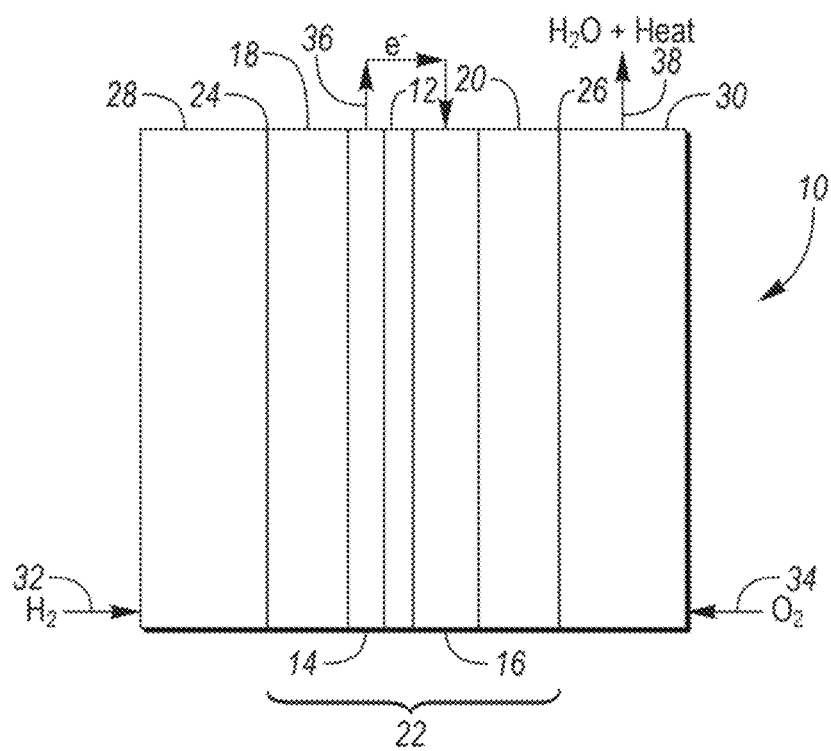
FIG. 1 is a schematic, side view of a fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and the relatively high current dependency on non-renewable fossil fuels as energy carriers in the transportation sector, there is an ever increasing need to develop and commercialize transportation technologies that use clean and sustainable sources of energy. One technology that possesses promise is a fuel cell (including polymer electrolyte membrane fuel cells (PEMFCs)). A fuel cell uses oxygen from air and compressed hydrogen as fuel sources, while only emitting water and heat. The widespread adoption of fuel cells would reduce carbon dioxide emissions. However, widespread adoption requires further research into cost reductions for catalysts (namely platinum catalysts) used in fuel cells.

A typical single fuel cell is composed of a polymer electrolyte membrane (PEM), an anode layer, a cathode layer and gas diffusion layers. These components form a membrane electrode assembly (MEA), which is surrounded by two flow-field plates. Out of all the MEA components, the catalyst, which is found in both the anode and cathode layers, is commonly the most expensive constituent, due to the necessity of using platinum (Pt) at both the anode and cathode, and a lack of opportunity to reduce its cost through economics of scale effects. Pure Pt, Pt—Co and Pt—Ni nanoparticles are the most commonly used catalyst materials for PEMFCs in industry.

Platinum catalysts are subject to dissolution and migration of $Pt^{2+}$ ions from the catalyst layer to other components in the fuel cell, such as the polymer electrolyte membrane (PEM). At the anode, Pt catalyzes a hydrogen oxidation reaction (HOR, $H_2 \rightarrow 2H^+ + 2e-$); and, at the cathode, Pt catalyzes the oxygen reduction reaction (ORR, $\frac{1}{2}O_2 + 2H^+ + 2e- \rightarrow H_2O$). The required loading of Pt is significantly higher at the cathode than at the anode, because the kinetics of the ORR are significantly slower than the kinetics of HOR. Furthermore, even when using a loading as low as 0.025 $mgPt/cm^2$ at the anode, HOR can proceed with kinetic losses of less than 20 mV. Alternatively, even when using significantly higher loadings of platinum of 0.1-0.4 $mgPt/cm^2$, ORR's kinetic penalty at currents relevant to operations of FCVs is approximately ~400 mV. During operation of the fuel cell, both at the anode and the cathode, Pt may undergo further degradation (e.g., dissolution, migration, and re-deposition that can lead to the loss in electrochemically-active surface area), which would then increase the kinetic overpotentials experienced by the entire PEMFC stack system throughout its lifetime.

Typically, any PEMFC stack may degrade over time due to a number of different possible factors (e.g., flooding, catalyst degradation, corrosion due to acidic environment, materials failure, overpotential build-up, etc.). Operating PEMFC at higher voltages greater than 0.8 V may produce more power for the stack system, however, it may cause the catalyst (and other components) to degrade more rapidly.

What is needed is a solution to reduce dissolution and to slow down migration while maintaining the beneficial activity of the platinum catalyst. Aspects of the present disclosure are directed to multi-element nanoparticles as catalysts to reduce the amount of active catalyst to reduce degradation and increase stability by creating new heterogeneous-structured catalysts. The use of the heterogenous-structured catalysts preserves electrochemical surface active area (ESCA) and/or mitigates PEM degradation, thereby extending the lifetime of the fuel cell stack for a given catalyst material loading.

FIG. 1 depicts a schematic, side view of fuel cell 10. Individual fuel cells 10 can be stacked to create a fuel cell stack. Fuel cell 10 includes polymer electrolyte membrane (PEM) 12, anode layer 14, cathode layer 16 and first and second gas diffusion layers (GDLs) 18 and 20. PEM 12 is situated between anode layer 14 and cathode layer 16. Anode layer 14 is situated between first GDL 18 and PEM 12 and cathode layer 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum, is used in anode layer 14 and cathode layer 16. The catalyst material is commonly the most expensive constituent of MEA 22. The catalyst material is supported on a catalyst support.

In one embodiment, first-principles density functional theory (DFT) algorithms, calculations and/or methodologies are used to determine a thermodynamic reaction pathway of an ORR occurring at a catalyst surface. The DFT algorithms may be used to model an adsorbed oxygen atom on a Pt catalyst and its reduction to OH and reaction with another $H^+$ (or $H_3O^+$), which may generate a water molecule ($H_2O$). The modelling accounts for the strength of the chemical and/or physical bonding for each adsorbate (—H, —OH, —O, and $H_2O$), and how it may affect catalytic activity and stability.

Figure 2:
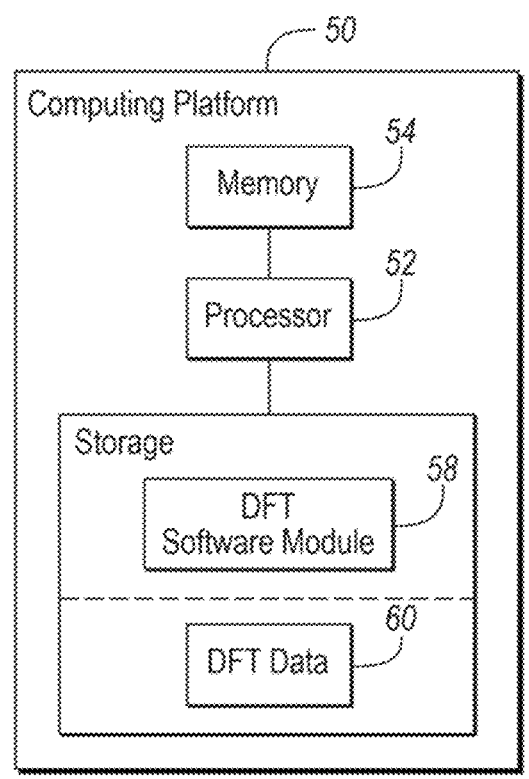
FIG. 2 is a schematic diagram of a computing platform that may be utilized to implement DFT algorithms, calculations and/or methodologies of one or more embodiments.

The DFT algorithms, calculations and/or methodologies of one or more embodiments are implemented using a computer platform, such as the computing platform 50 illustrated in FIG. 2. The computing platform 50 may include a processor 52, memory 54, and non-volatile storage 56. The processor 52 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 54. The memory 54 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 56 may include one or more persistent data storage devices such as a hard drive, optical drive, tape drive, non-volatile solid state device, cloud storage or any other device capable of persistently storing information.

Processor 52 may be configured to read into memory 54 and execute computer-executable instructions residing in DFT software module 58 of the non-volatile storage 56 and embodying DFT slab model algorithms, calculations and/or methodologies of one or more embodiments. Software module 58 may include operating systems and applications. Software module 58 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by the processor 52, the computer-executable instructions of the DFT software module 58 may cause the computing platform 50 to implement one or more of the DFT algorithms and/or methodologies disclosed herein. Non-volatile storage 56 may also include DFT data 60 supporting the functions, features, calculations, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

Figure 3A:
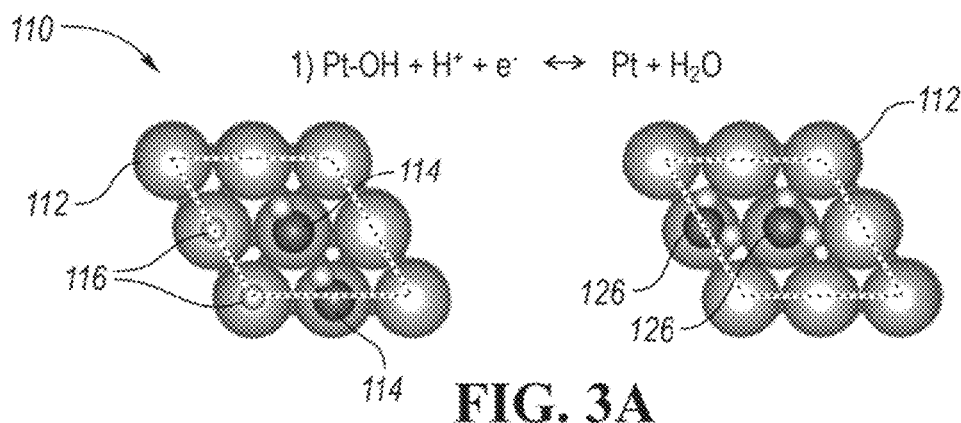
FIG. 3A through 3F depict schematic views of different catalyst layer structures for fuel cells.
Figure 3B:
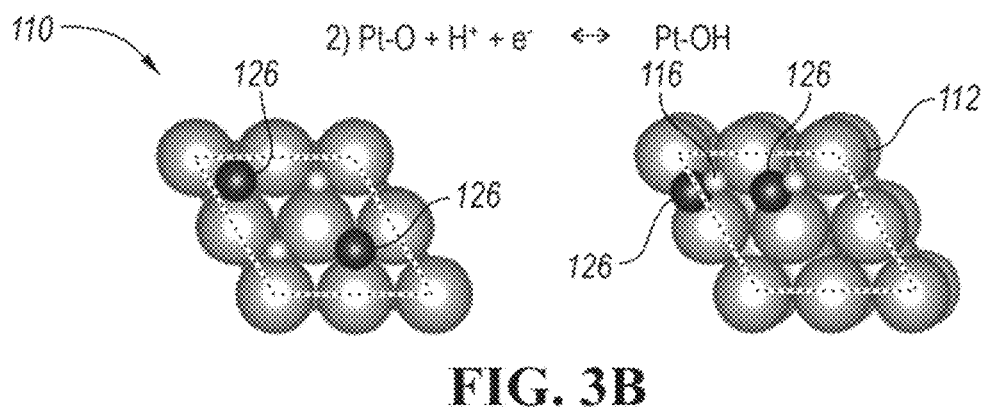
Figures 3C, 3D, 3E, 3F:
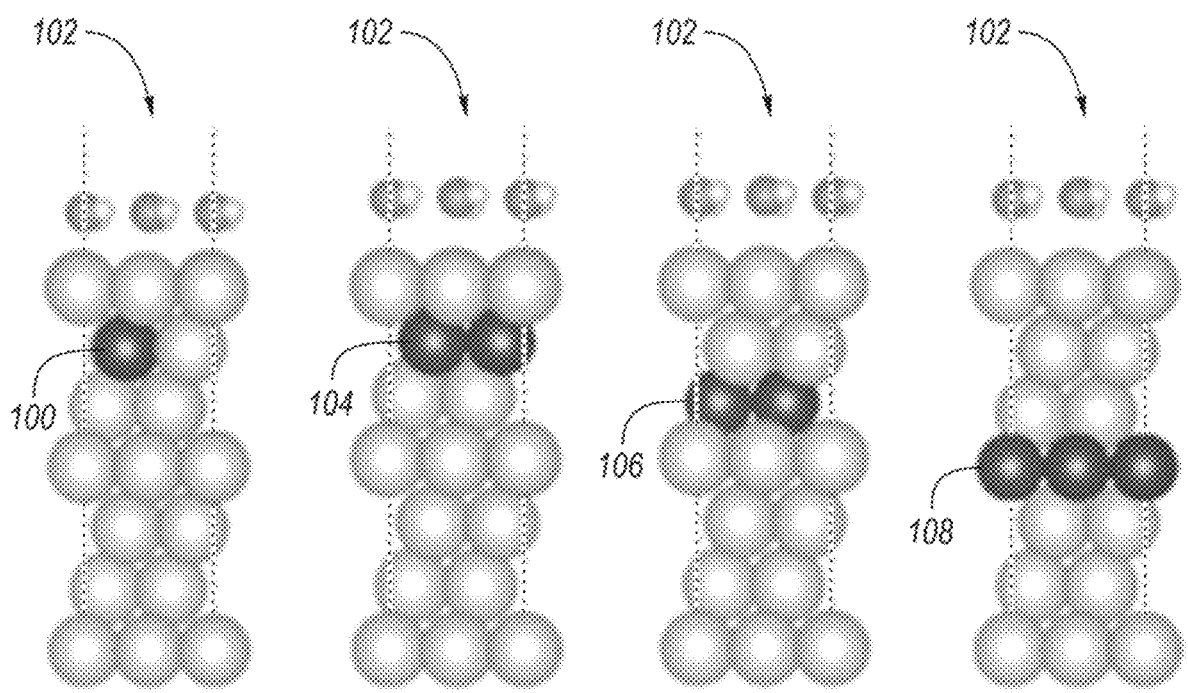

As generated by DFT software module 58, FIGS. 3A through 3F depict schematic views of different catalyst layers and the effect of Co doping and substitution on Pt catalyst on an ORR reaction (i.e. potential of a fuel cell). As shown by the DFT calculations, different chemical doping and/or substitution may significantly affect catalyst activity. The DFT software module 58 calculates results on an ORR reaction occurring at pure Pt and Pt—Co catalyst materials, where the Co atoms are located in various sites within a Pt(111) catalyst slab. FIG. 3C depicts Co atoms located at site 100 of Pt(111) catalyst slab 102. FIG. 3D depicts Co atoms located at sites 104 of Pt(111) catalyst slab 102. FIG. 3E depicts Co atoms located at sites 106 of Pt(111) catalyst slab 102. FIG. 3F depicts Co atoms located at sites 108 of Pt(111) catalyst slab 102. As shown in FIG. 3A, the DFT calculations demonstrate the reaction below takes place at 0.74 V versus $V_{RHE}$ in pure Pt.

$$Pt—OH+H^{+}+e^{-} \leftrightarrow Pt+H_2O \tag{1}$$

Catalyst layer 110 depicts the reactant side of reaction (1) including platinum atoms 112, hydroxide ions 114 and hydrogen ions 116. Catalyst layer 118 depicts the produce side of reaction (1) including platinum atoms 112 and water molecules 120. As shown in FIG. 3B, the DFT calculations demonstrate the reaction below takes place at 0.95 V versus $V_{RHE}$ in pure Pt.

$$Pt—O+H^{+}+e^{-} \leftrightarrow Pt—OH \tag{2}$$

According to the DFT calculations, when Co is substituted at site 100 or sites 104, which are in the subsurface of the Pt(111) catalyst slab 102, the potential of reactions (1) and (2) are increased. According to the DFT calculations, when Co is substituted at sites 106 and 108, which are located toward the bulk, the Co imparts less of an effect. For instance, Co situated at sites 106 shows a similar potential as Co situated at site 100, even though the concentration of Co in the Pt catalyst is different. In the case of Co situated at sites 108, the effect is negligible in comparison to pure Pt. Since Co situated at sites 108 lead to the same potential as Co situated at sites 106, pure Pt catalyst may be replaceable with Pt—Co alloys, where three layers of Pt are situated on top of Co metals (e.g. Pt shell and Co core). In such embodiments, the catalyst material including Co may save Pt loading and cost, while providing the same performance as compared with pure Pt. Table 1 set forth below shows the reaction potentials for each type of Pt(111) catalyst (with and without Co):

TABLE 1

| Catalyst | Reaction (1) | Reaction (2) | Standard potential |
|---|---|---|---|
| Pure Pt(111) | 0.74 V | 0.95 V | Agrees well with experiment |
| Co-doping subsurface (i.e. 100) | 0.84 V | 0.98 V | 0.1 V increase from reaction (1) |
| Co-substitution (i.e. 104) | 1.07 V | 1.29 V | −0.3 V increase from reactions (1) and (2) |
| Co-substitution (i.e. 106) | 0.84 V | 0.97 V | Similar to (1) |
| Co-substitution (i.e. 108) | 0.72 V | 0.93 V | Similar to pure Pt |

Depending on facet distribution, concentration of one or more alloying elements, and alloy distribution within a Pt catalyst (e.g. surface, subsurface or toward bulk), the catalytic activity as well as the stability may be significantly influenced. The surface layer may be the outermost top surface layer. The subsurface layer may be one layer directly below the surface layer. Bulk layers may be the layers below the surface and subsurface layers. In other embodiments, the surface and subsurface layers may be the first three layers as the surface may not be pristine.

As generated by DFT software module 58, FIGS. 4A through 4F depict Co-doped Pt catalyst models 150, 152, 154, 154, 156, 158 and 160, respectively. Catalyst model 150 includes doped Co at surface sites 162. Catalyst model 152 includes doped Co at subsurface site 164. Catalyst model 154 includes doped Co at a third layer site 166. Catalyst model 156 includes doped Co at a fourth layer site 168. Catalyst model 158 includes doped Co at a fifth layer site 170. Catalyst model 160 includes doped Co in a bulk region 172. In another embodiment, the Co doping may be replaced with Ni doping. Table 2 below reports the doping energy ($\Delta E_{doping}$) [eV/Site] for Co and Ni using calculated DFT values.

TABLE 2

| $\Delta E_{doping}$ [eV/Site] | Ni Doping | Co Doping |
| --- | --- | --- |
| Surface | 0.226 | 0.580 |
| Subsurface | −0.306 | −0.001 |
| Third Layer | −0.257 | 0.037 |
| Fourth Layer | −0.267 | 0.043 |
| Fifth Layer | −0.239 | 0.054 |
| Bulk | −0.148 | 0.138 |

From the DFT calculated data, it is observed that the calculated doping energy ($\Delta E_{doping}$) for Ni is generally more "negative" compared to Co-doped Pt system. Where the crystal structure of Ni and Pt are similar, both being face-centered cubic (fcc), Co has a ground state of being hexagonal closed packed (hcp) structure. Mixing may be more easily induced when crystal structure, size, and/or electronic valence are similar. The DFT calculated data also supports that it may be harder to segregate Ni atoms at the subsurface region of the Pt catalyst due to the strong mixing of Ni and Pt. When the calculated $\Delta E_{doping}$ is less than zero, mixing is induced favorably. From the DFT calculated results, it indicates that Co rather segregate at the subsurface of Pt(111), while Ni can be mixed throughout the Pt (except at the surface of Pt). As shown in Table 2, the relatively high positive values for Ni and Co doping at the surface demonstrates the least favorable for Ni and Co to segregate out toward Pt surface. Table 2 also shows that it is most favorable for the Ni and Co to occupy the subsurface. The doping in further layers down trend toward bulk values.

Figure 5A:
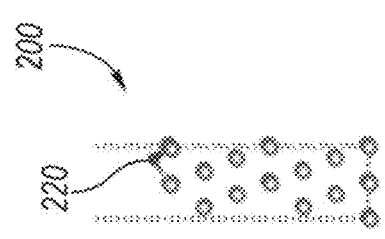
FIGS. 5A through 5J depict schematic views of catalyst layer models using DFT calculations.
Figure 5B:
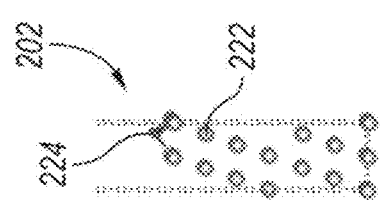
Figure 5C:
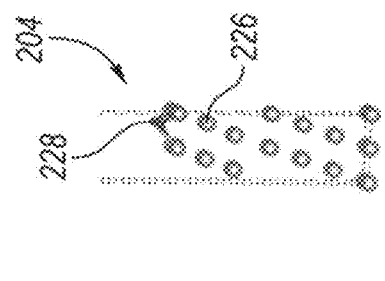
Figure 5D:
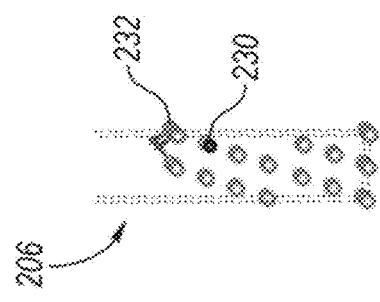
Figure 5E:
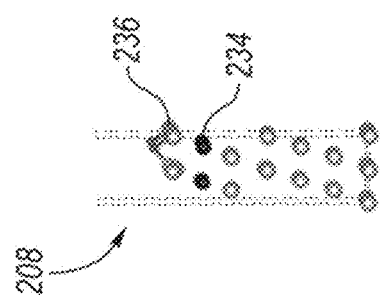
Figure 5F:
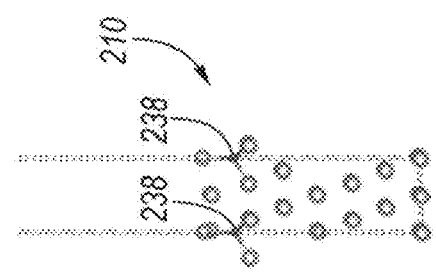
Figure 5G:
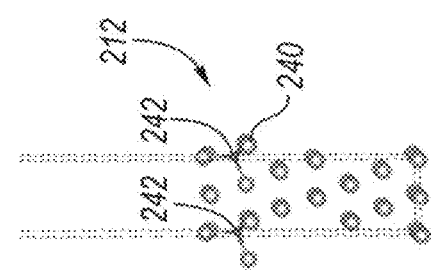
Figure 5H:
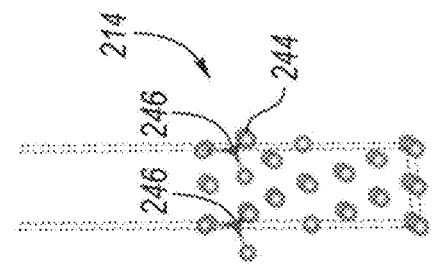
Figure 5I:
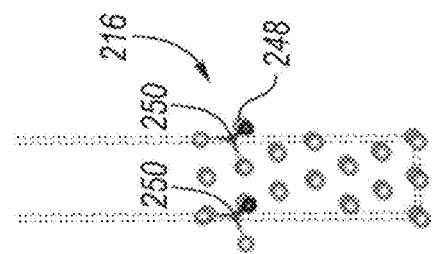
Figure 5J:
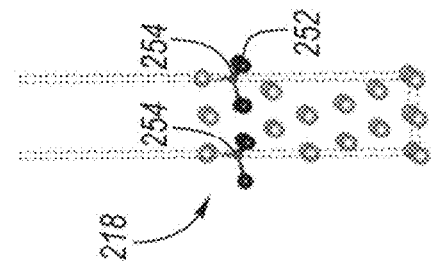

FIGS. 5A though 5J depict catalyst layers 200, 202, 204, 206, 208, 210, 212, 214, 216 and 218, respectively, using DFT calculations. Catalyst layer 200 is a pure Pt(111) material with a bound oxygen atom 220 at the surface. Catalyst layer 202 includes an Ni doping 222 and a bound oxygen 224 at the surface. Catalyst layer 204 includes Ni atoms at a subsurface region 226 and a bound oxygen 228 at the surface. Catalyst layer 206 includes a Co doping 230 and a bound oxygen 232 at the surface. Catalyst layer 208 includes Co atoms at a subsurface region 234 and a bound oxygen 236 at the surface. Catalyst layer 210 is a pure Pt(111) material with bound oxygen atoms 238 at subsurface region. Catalyst layer 212 includes an Ni doping 240 and bound oxygens 242 at a subsurface region. Catalyst layer 214 includes Ni atoms at a subsurface region 244 and bound oxygens 246 at a subsurface region. Catalyst 216 includes a Co doping 248 and bound oxygens 248 at a subsurface region. Catalyst 218 includes Co atoms a subsurface region 252 and bound oxygens 254 at the subsurface region 252. Table 3 shows the calculated DFT oxygen binding energies ($\Delta E_{binding,O}$) for the depicted pure Pt, Pt—Ni, and Pt—Co systems.

TABLE 3

| $\Delta E_{doping}$ [eV/O] | Surface | Subsurface |
| --- | --- | --- |
| Pt(111) | −1.664 | +1.374 |
| Ni-doped | −1.189 | +0.555 |
| Ni-subsurface | −1.100 | −0.407 |
| Co-doped | −1.146 | +0.285 |
| Co-subsurface | −1.055 | −0.992 |

Depending on the composition of the catalyst, oxygen binding energies may be affected dramatically, leading to different catalytic activities and degradation. The $\Delta E_{binding,O}$ on pure Pt(111) surface is −1.664 eV, whereas $\Delta E_{binding,O}$ of Ni— and Co-doped/-substituted Pt(111) vary from −1.0 to −1.2 eV. The increase in oxygen binding energies indicates that once the oxygen atom is adsorbed at the catalyst surface, they may be also desorbed more easily, leading to increase in the catalytic activities (forming $H_2O$ more easily). The $\Delta E_{binding,O}$ on pure Pt(111) subsurface is +1.374 eV, which indicates that it takes a significant amount of energy for oxygen to penetrate and form at the subsurface. However, once either Co and Ni doping and substitution take place at the Pt catalyst, $\Delta E_{binding,O}$ decreases significantly. This indicates that substrate oxide formation may become more favorable where Pt and Co/Ni dissolution steps are triggered more easily, especially at the high operating potential of PEMFCs. While Ni and Co doping and substitution in Pt may enhance the catalytic activity, the stability of Pt-M catalyst is not as favorable, compared to pure Pt catalyst. In one or more embodiments, catalytic activity (i.e. PEMFC performance), catalytic stability (i.e. PEMFC lifetime) and catalyst cost are concurrently optimized.

Figure 6A:
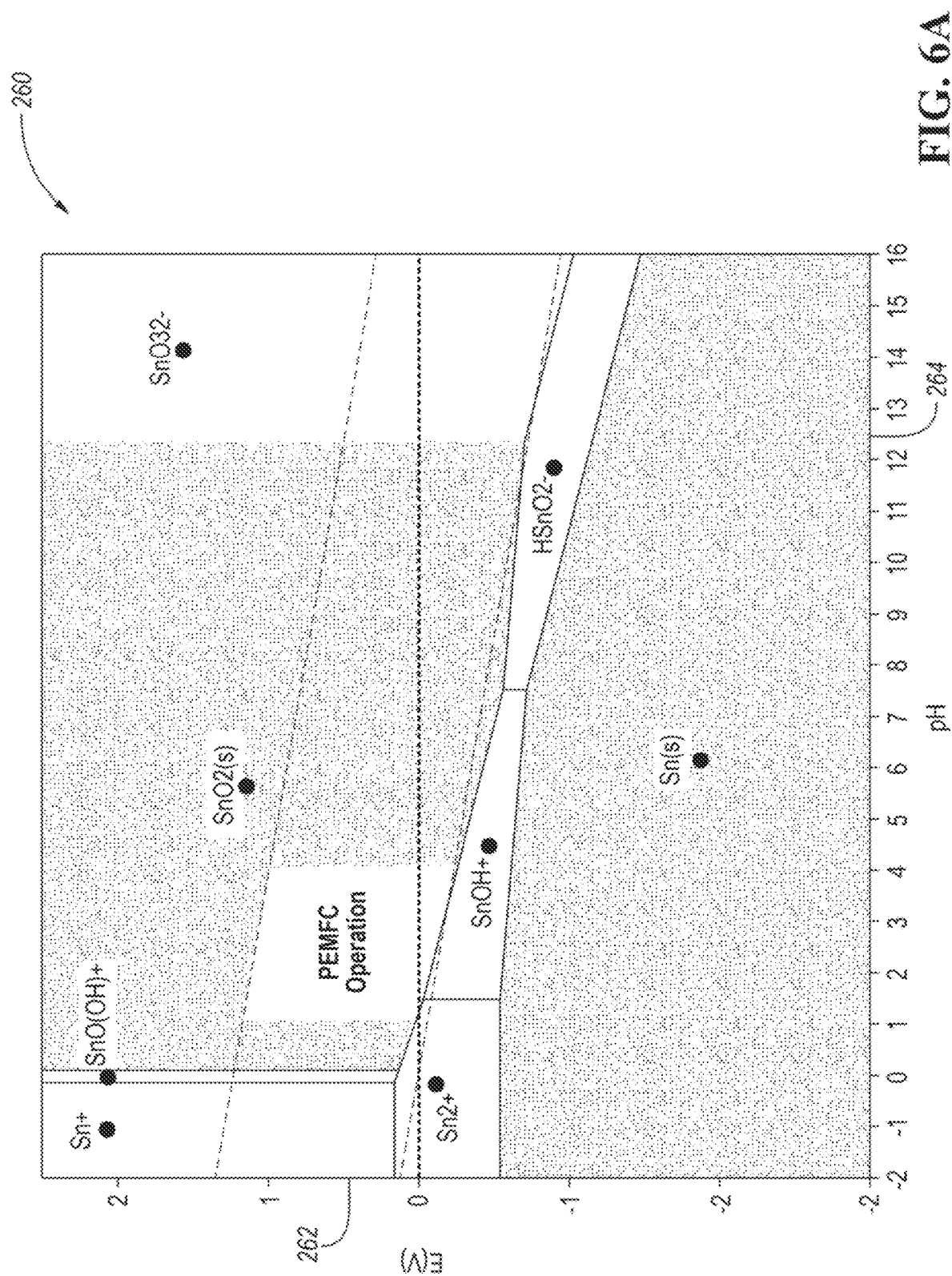
FIG. 6A depicts a Pourbaix diagram showing a graphical presentation of the thermodynamic equilibrium states of a metal (tin)-polymer electrolyte (PEM) system.

FIG. 6A depicts a Pourbaix diagram 260 showing a graphical presentation of the thermodynamic equilibrium states of a tin (Sn) as a function of different acidities and voltages. Pourbaix diagram 260 plots electrode potential of tin (Sn) in E(V) 262 versus pH 264 of the electrolyte. The Pourbaix diagram 260 shows that Sn will passivate to $SnO_2$ when pH varies from 1 to 4 and voltage fluctuates from 0 to 1 V (identifying an operating regime relevant to PEMFC operation). Except for Co, Ni, and Re, other elements (W, Mo, Ge, Sn, Nb, Ta, and Ti) may form an oxide at this region: e.g., $WO_{3-x}$, $MoO_{3-x}$, $GeO_{2-x}$, $SnO_{2-x}$, $Nb_2O_{5-y}$, $Ta_2O_{5-y}$, and $TiO_{2-x}$ (where $0 \le x \le 2$ and $0 \le y \le 5$). Co, Ni, and Re will likely become $Co^{2+}$, $Ni^{2+}$, and $ReO^{4-}$, in this PEMFC operation regime.

Figure 6B:
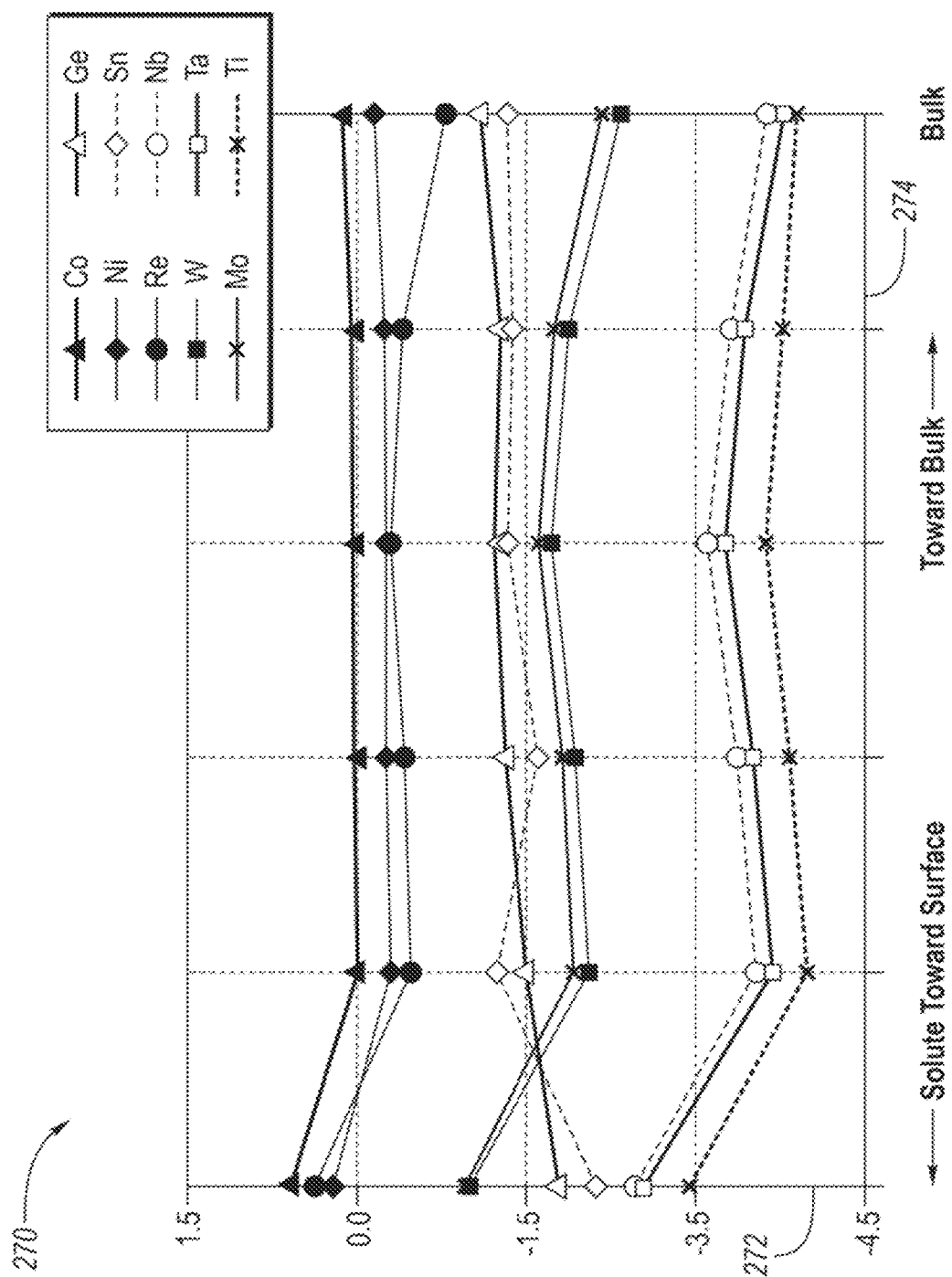
FIG. 6B depicts a graph showing calculated DFT results for ten different metals (M=cobalt (Co), nickel (Ni), rhenium (Re), tungsten (W), molybdenum (Mo), germanium (Ge), tin (Sn), niobium (Nb), tantalum (Ta), and titanium (Ti)) embedded in Pt-M catalyst at various locations within a catalyst layer.

FIG. 6B depicts a graph 270 showing calculate DFT results for ten different metals (M=Co, Ni, rhenium (Re), tungsten (W), molybdenum (Mo), germanium (Ge), tin (Sn), niobium (Nb), tantalum (Ta), and titanium (Ti)) embedded in Pt-M catalyst at various locations within a catalyst layer. Graph 270 shows segregation tendency of Pt-M by plotting mixing energy [eV/Site] as the y-axis 272 versus distance from the catalyst layer surface as the x-axis 274. The lowest mixing energy for each metal is the lowest point on each metal curve. Generally, positive values of DFT mixing energies indicate phase generation and negative values indicate mixing can be induced. The magnitude of mixing energies determines the strength or weakness of the mixing. For example, Ti and Pt mixes more strongly than Ni and Pt. Here, Co, Ni and Re may ionize to $Co^{2+}$, $Ni^{2+}$, $ReO_4^-$, if directly exposed to PEMFC environment. The other elements are likely to be passivate, i.e., form a stable oxide $MO_x$, during PEMFC operating regime.

As shown by the DFT calculations previously reported herein, Co and Ni have the strongest preference in the subsurface region. While the mixing energy is generally positive for Co (due to difference in its crystal structure), Ni prefers to mix with Pt (i.e., mixing energy is slightly below zero) due to similarity in its crystal structure. Re also has a similar magnitude of mixing energies with Co and Ni, however, it mostly prefers to mix at the bulk scale. The other elements listed in FIG. 6B mix relatively very strongly (i.e., very negative mixing energies), when compared with Ni, Co, and Re. W and Mo have the similar trends, where bulk mixing with Pt is most preferred. Ge and Sn share the same trends, where surface mixing is mostly preferred (while the overall mixing energies are quite negative). Nb and Ta mix strongly at the bulk, while Ti prefers to stay at the subsurface.

As supported by FIG. 6B, a different element M in Pt-M may lead to different segregation within the catalyst materials, all leading to distinct catalytic activity and stability. For example, both Co and Ni can increase the catalytic activity; however, Pt—Co and Pt—Ni could lead to a faster degradation due to favorable subsurface oxide formation as well as their tendencies to be ionized to $Co^{2+}$ and $Ni^{2+}$ during the PEMFC operation, once exposed at the surface. FIG. 6B shows a DFT calculations on Pt—Sn, where Sn likes to segregate toward the surface. While the oxygen binding energy at Pt—Sn is increased (not as much as Pt—Co or Pt—Sn), this increases the catalytic activity to form $H_2O$ more easily during PEMFC operation. At the same time, Sn only passivates to $SnO_2$, but is unlikely to dissolve easily, when to compare with $Co^{2+}$ or $Ni^{2+}$ systems.

In light of the DFT calculation shown in FIGS. 3 through 6, material selection and inter-relationships may impact PEMFC performance, degradation, and lifetime. In one or more embodiments, polyelemental catalyst structures are disclosed that have three or more different metals other than platinum ($Pt-M_I-M_{II}-M_{III}$). The polyelemental catalyst structures are configured to be utilized in catalyst layers of PEMFCs. The size of each polyelemental catalyst particle may be any of the following values or in a range of any two of the following values: 2, 3, 4, 5, 6, 7, 8, 9, 10, 20, 30, 40, 50, 100, 150, 200 and 250 nm.

In certain embodiments, $M_I$ is a metal that enhances catalytic activity, otherwise referred to as a catalytic activity enhancer. $M_I$ metals include 3d, 4d and 5d transition metals including but not limited to vanadium (V), chromium (Cr), manganese (Mn), iron (Fe), Co, Ni, copper (Cu) (3d transition metals); Y and Zr (4d transition metals); and, Hf and Re (5d transition metals). $M_I$ metals are configured to affect the electronic structure of Pt to increase the catalytic activity. When an $M_I$ metal is exposed to the PEMFC environment (pH from 1 to 4; voltage from 0 to 1 V vs. $V_{RHE}$), the $M_I$ metal may be ionized and dissolve into the solution (e.g. $Ni^{2+}$, $Mn^{2+}$, $Fe^{3+}$, $Co^{2+}$, etc.).

In certain embodiments, $M_{II}$ is a metal that contributes to the stability of the polyelemental catalyst, otherwise referred to as a stability enhancer. Non-limiting examples of $M_{II}$ metals include noble metals, such as ruthenium (Ru), rhodium (Rh), palladium (Pd), silver (Ag), osmium (Os), iridium (Ir), and gold (Au), and passivating metals, such as W, Mo, Ge, Sn, Nb, Ta, and Ti. A passivating metal may become a passivating oxide under oxidizing conditions (e.g. high voltage and/or high pH) but does not dissolve in the acidic environment under PEMFC operating conditions. Depending on the local environment of the catalysts, W, Mo, Ge, Sn, Nb, Ta, and Ti, may oxidize to $WO_{3-x}$, $MoO_{3-x}$, $GeO_{2-x}$, $SnO_{2-x}$, $Nb_2O_{5-y}$, $Ta_2O_{5-y}$, and $TiO_{2-x}$ (where $0 \leq x \leq 2$ and $0 \leq y \leq 5$).

Figure 7:
FIG. 7 depicts a periodic table showing electronegativities of several elements.

In certain embodiments, $M_{III}$ is a metal configured to induce relatively strong covalent bonding between Pt, $M_I$, $M_{II}$, and a support material (e.g. carbon). For example, the selection of the $M_{III}$ metal can be carried out by comparing the electronegativities. FIG. 7 depicts a periodic table 300 showing electronegativities of several elements.

Metallic bonds often have very low electronegativity difference, if any. If the electronegativity difference is over 1.7, then it is highly likely that an ionic bond forms. A covalent bond typically forms under 1.7. A polar covalent bond typically forms between 0.3 to 1.7. For example, if $M_I$ equals Ni and $M_{II}$ equals Ge (both with the electronegativity of 1.8), an element that has an electronegativity ($\chi$) such that $0.1 < \chi < 1.5$ or $2.1 < \chi < 3.5$ is selected. At the same time, the electronegativity difference with Pt ($\chi = 2.2$) and C ($\chi = 2.5$) is considered: $0.5 < \chi < 1.9$ or $2.5 < \chi < 3.9$ for Pt and $0.8 < \chi < 2.2$ or $2.8 < \chi < 4.2$ for C. In this embodiment, an element with electronegativity of $0.8 < \chi < 1.5$ or $2.8 < \chi < 3.5$ can satisfy the criteria to form covalent bonding with Pt, Ni, Ge, and C. While not many metals will satisfy the upper limit of this condition ($2.8 < \chi < 3.5$), some metals such as Mg (1.2), Sc (1.3), Y (1.2), Zr (1.4), Hf (1.3) and many others can satisfy the lower bound of this criterion. The metal selected for $M_{III}$ may have a dual role for being either $M_I$ (enhanced activity) or $M_{II}$ (enhanced stability). In addition, for catalyst support other than carbon, such as $TiO_2$, and $SnO_2$, the procedure to select $M_{III}$ is modified based on electronegativities.

FIGS. 8A through 8I depict schematic, side views of polyelemental catalyst structures 350, 352, 354, 356, 358, 360, 362, 364 and 366 configured to be used in electrode catalyst layers of fuel cells according to one or more embodiments. As shown in FIGS. 8A through 8I, polyelemental catalyst structures 350, 352, 354, 356, 358, 360, 362, 364 and 366 are generally triangular-shaped. In one or more embodiments, the shape of the polyelemental catalyst structure may vary depending on synthesis conditions, and interfacial energies between elements. Non-limiting examples of shapes include generally ovular, octahedron, triangular, rectangular, cubic, hexagonal and combinations thereof. The shapes may be flattened along two of the three dimensions of the shapes. The polyelemental catalyst particle may include at least 1 atomic % of $M_I$, $M_{II}$, and $M_{III}$ metals. The atomic % of the $M_I$, $M_{II}$, and $M_{III}$ metals cumulatively may be less than 50 atomic %.

In one or more embodiments, maximizing surface area exposure of Pt and/or Pt-$M_{II}$ is desirable to increase the electrochemically active surface area (ECSA). In one or more embodiments, exposing a small concentration of $M_{II}$ metals within a Pt matrix is provided because the $M_{II}$ metals do not lead to severe dissolution. The small concentration may be any of the following values or in a range of any two of the following values: 1, 2, 3, 4, 5, 6, 7, 8, 9, 10, 11, 12, 13, 14, 15, 16 and 16.7 atomic %. While an $M_I$ metal may enhance the catalytic activity, an $M_I$ metal may dissolve in the acid (e.g. $N^{i2+}$, $Co^{2+}$). In other embodiments, the $M_I$ and $M_{II}$ metals may form a matrix together at a core region of the catalyst. An $M_{III}$ metal may form a distinct interface with Pt with a stronger attraction to the catalyst support materials (e.g. carbon, $TiO_2$, $SnO_2$). Increasing the interfacial contact with other elements, Pt, $M_I$, and $M_{II}$ are desirable for stronger formation of covalent network bonding in certain embodiments. The loading of the polyelemental catalyst material on the catalyst support may be any of the following values or in a range of any two of the following values: 0.01, 0.025, 0.1, 0.2, 0.3, 0.4, 0.5, 0.6, 0.7, 0.8, 0.9 and 1.0 mgCatalyst/cm$^2$.

FIG. 8A depicts a schematic, side view of polyelemental catalyst structure 350 supported on catalyst support layer 368. Polyelemental catalyst structure 350 includes region 386, first core region 388 and second core region 390. Region 386 is generally spherical in shape. First core region 388 is generally ovular in shape. Second core region 390 is generally ovular in shape. A portion of region 386 is in direct contact with catalyst support layer 368. Region 386 is configured to support first and second core regions 388 and 390. A portion of region 386 is in interfacial contact with first core region 388 and second core region 390. Portions of first core region 388 and second core region 390 are in interfacial contact with each other. Region 386, formed of an $M_{III}$ metal, is in contact with the catalyst support layer 368 and Pt, and the $M_I$ and $M_{II}$ metals. Region 386 may be pure $M_{III}$ metal. In other embodiments, region 386 is made of any of the following values or in a range of any two of the following values of the $M_{III}$ metal: 90, 91, 92, 93, 94, 95, 96, 97, 98, 99 and 99.5 atomic percent. First core region 388 is formed of Pt. First core region 388 may be pure Pt. In other embodiments, first core region 388 is made of any of the following values or in a range of any two of the following values of Pt: 90, 91, 92, 93, 94, 95, 96, 97, 98, 99 and 99.5 atomic percent. Second core region 390 is formed of a matrix of $M_I$ and $M_{II}$ metals. The atomic ratio of $M_I$ metal to $M_{II}$ metal in the second core region 390 may be any of the following values or in a range of any two of the following values: 0.5:1, 0.75:1, 1:1, 1:0.75 and 1:0.5.

FIG. 8B depicts a schematic, side view of polyelemental catalyst structure 352 supported on catalyst support layer 370. Polyelemental catalyst structure 352 includes region 392, first core region 394 and second core region 396. Region 392 is formed of two discontinuous regions, as shown in FIG. 8B. Each of the discontinuous regions is generally spherical in shape. First core region 394 is generally ovular in shape. Second core region 396 is generally ovular in shape. A portion of region 392 is in direct contact with catalyst support layer 370. Region 392 is configured to support first and second core regions 394 and 396. A portion of region 392 is in interfacial contact with first core region 394 and second core region 396. Portions of first core region 394 and second core region 396 are in interfacial contact with each other. Region 392 is formed of an $M_{III}$ metal. Region 392 may be pure $M_{III}$ metal. In other embodiments, region 392 is made of any of the following values or in a range of any two of the following values of the $M_{III}$ metal: 90, 91, 92, 93, 94, 95, 96, 97, 98, 99 and 99.5 atomic percent. A portion of first core region 394 may make direct contact with catalyst support layer 370. First core region 394 is formed of Pt. First core region may be pure Pt. In other embodiments, first core region 394 is made of any of the following values or in a range of any two of the following values of Pt: 90, 91, 92, 93, 94, 95, 96, 97, 98, 99 and 99.5 atomic percent. A portion of second core region 396 may make direct contact with catalyst support layer 370. Second core region 396 is formed of a matrix of $M_I$ and $M_{II}$ metals. The atomic ratio of $M_I$ metal to $M_{II}$ metal in the second core region 396 may be any of the following values or in a range of any two of the following values: 0.5:1, 0.75:1, 1:1, 1:0.75 and 1:0.5.

FIG. 8C depicts a schematic, side view of polyelemental catalyst structure 354 supported on catalyst support layer 372. Polyelemental catalyst structure 354 includes region 398, first core region 400 and second core region 402. Region 398 is generally spherical in shape. First core region 400 is generally ovular in shape. Second core region 402 is generally ovular in shape. A portion of region 398 is in direct contact with catalyst support layer 372. Region 398 is configured to support first and second core regions 400 and 402. A portion of region 398 is in interfacial contact with first core region 400 and second core region 402. Portions of first core region 400 and second core region 402 are in interfacial contact with each other. Region 398 is formed of an $M_{III}$ metal. Region 398 may be pure $M_{III}$ metal. In other embodiments, region 398 is made of any of the following values or in a range of any two of the following values of the $M_{III}$ metal: 90, 91, 92, 93, 94, 95, 96, 97, 98, 99 and 99.5 atomic percent. First core region 400 is formed of a matrix of Pt and $M_{II}$ metal. The atomic ratio of Pt to $M_{II}$ metal in first core region 400 may be any of the following values or in a range of any two of the following values: 0.5:1, 0.75:1, 1:1, 1:0.75 and 1:0.5. Second core region 402 is formed of a $M_I$ metal. Second core region 402 may be pure $M_I$ metal. In other embodiments, first core region 402 is made of any of the following values or in a range of any two of the following values of $M_I$ metal: 90, 91, 92, 93, 94, 95, 96, 97, 98, 99 and 99.5 atomic percent.

FIG. 8D depicts a schematic, side view of polyelemental catalyst structure 356 supported on catalyst support layer 374. Polyelemental catalyst structure 356 includes region 404, first core region 406 and second core region 408. Region 404 is formed of two discontinuous regions, as shown in FIG. 8D. Each of the discontinuous regions is generally spherical in shape. First core region 406 is generally ovular in shape. Second core region 408 is generally ovular in shape. A portion of region 404 is in direct contact with catalyst support layer 374. Region 404 is configured to support first and second core regions 406 and 408. A portion of region 404 is in interfacial contact with first core region 406 and second core region 408. Portions of first core region 406 and second core region 408 are in interfacial contact with each other. Region 404 is formed of an $M_{III}$ metal. Region 404 may be pure $M_{III}$ metal. In other embodiments, region 404 is made of any of the following values or in a range of any two of the following values of the $M_{III}$ metal: 90, 91, 92, 93, 94, 95, 96, 97, 98, 99 and 99.5 atomic percent. A portion of first core region 406 may make direct contact with catalyst support layer 374. First core region 406 is formed of a matrix of Pt and $M_{II}$ metal. The atomic ratio of Pt to $M_{II}$ metal in first core region 406 may be any of the following values or in a range of any two of the following values: 0.5:1, 0.75:1, 1:1, 1:0.75 and 1:0.5. A portion of second core region 408 may make direct contact with catalyst support layer 374. Second core region 408 is formed of a $M_I$ metal. Second core region 408 may be pure $M_I$ metal. In other embodiments, first core region 408 is made of any of the following values or in a range of any two of the following values of $M_I$ metal: 90, 91, 92, 93, 94, 95, 96, 97, 98, 99 and 99.5 atomic percent.

FIG. 8E depicts a schematic, side view of polyelemental catalyst structure 358 supported on catalyst support layer 376. Polyelemental catalyst structure 358 includes region 410, first core region 412 and second core region 414. Region 410 is generally ovular in shape. First core region 412 is generally ovular in shape. Second core region 414 is generally ovular in shape. A portion of region 410 is in direct contact with catalyst support layer 376. Region 410 is configured to support first and second core regions 412 and 414. A portion of region 410 is in interfacial contact with first core region 412 and second core region 414. Portions of first core region 412 and second core region 414 are in interfacial contact with each other. Region 410 is formed of a matrix of $M_{II}$ and $M_{III}$ metals. The atomic ratio of $M_{II}$ metal to $M_{III}$ metal in the region 410 may be any of the following values or in a range of any two of the following values: 0.5:1, 0.75:1, 1:1, 1:0.75 and 1:0.5. First core region 412 may be pure Pt. In other embodiments, first core region 412 is made of any of the following values or in a range of any two of the following values of Pt: 90, 91, 92, 93, 94, 95, 96, 97, 98, 99 and 99.5 atomic percent. Second core region 414 may be pure $M_I$ metal. In other embodiments, second core region 414 is made of any of the following values or in a range of any two of the following values of the $M_I$ metal: 90, 91, 92, 93, 94, 95, 96, 97, 98, 99 and 99.5 atomic percent.

Figure 8F:
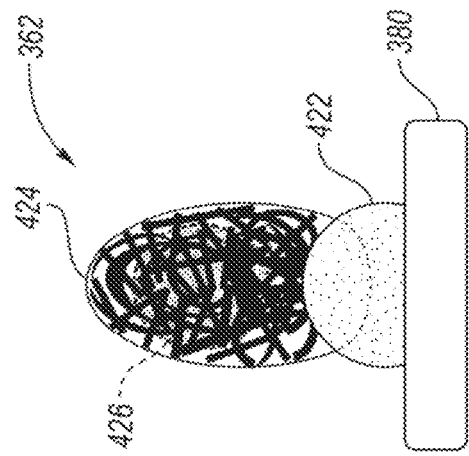

FIG. 8F depicts a schematic, side view of polyelemental catalyst structure 360 supported on catalyst support layer 378. Polyelemental catalyst structure 360 includes region 416, first core region 418 and second core region 420. Region 416 is generally ovular in shape. First core region 418 is generally ovular in shape. Second core region 420 is generally spherical in shape. A portion of region 416 is in direct contact with catalyst support layer 378. Region 416 is configured to support first and second core regions 418 and 420. A portion of region 416 is in interfacial contact with first core region 418. Portions of first core region 418 and second core region 420 are in interfacial contact with each other. Region 416 is formed of a matrix of $M_{II}$ and $M_{III}$ metals. The atomic ratio of $M_{II}$ metal to $M_{III}$ metal in the region 416 may be any of the following values or in a range of any two of the following values: 0.5:1, 0.75:1, 1:1, 1:0.75 and 1:0.5. First core region 418 is formed of a matrix of Pt and $M_{II}$ metal. The atomic ratio of Pt to $M_{II}$ metal in the first core region 418 may be any of the following values or in a range of any two of the following values: 0.5:1, 0.75:1, 1:1, 1:0.75 and 1:0.5. Second core region 420 may be pure $M_I$ metal. In other embodiments, second core region 420 is made of any of the following values or in a range of any two of the following values of the $M_I$ metal: 90, 91, 92, 93, 94, 95, 96, 97, 98, 99 and 99.5 atomic percent.

Figure 8G:
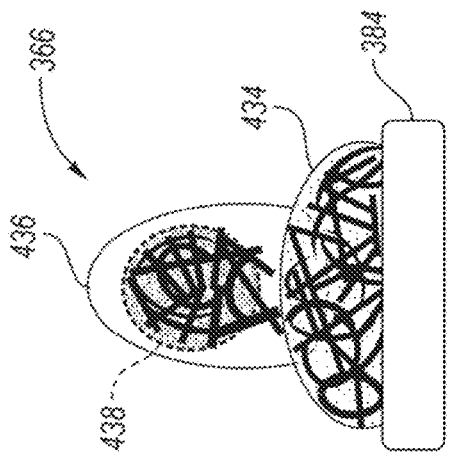

FIG. 8G depicts a schematic, side view of polyelemental catalyst structure 362 supported on catalyst support layer 380. Polyelemental catalyst structure 362 includes region 422, first core region 424 and second core region 426. Region 422 is generally spherical in shape. First core region 424 is generally ovular in shape. Second core region 426 is generally spherical in shape. A portion of region 422 is in direct contact with catalyst support layer 380. Region 422 is configured to support first and second core regions 424 and 426. A portion of region 422 is in interfacial contact with first core region 424. Portions of first core region 424 and second core region 426 are in interfacial contact with each other. Region 422 may be pure $M_{II}$ metal. In other embodiments, second core region 426 is made of any of the following values or in a range of any two of the following values of the $M_{II}$ metal: 90, 91, 92, 93, 94, 95, 96, 97, 98, 99 and 99.5 atomic percent. First core region 424 is formed of a matrix of Pt and $M_{II}$ metal. The atomic ratio of Pt to $M_{II}$ metal in the first core region 424 may be any of the following values or in a range of any two of the following values: 0.5:1, 0.75:1, 1:1, 1:0.75 and 1:0.5. Second core region 426 is formed of a matrix of $M_I$ and $M_{II}$ metals. The atomic ratio of $M_I$ metal to $M_{II}$ metal in the second core region 426 may be any of the following values or in a range of any two of the following values: 0.5:1, 0.75:1, 1:1, 1:0.75 and 1:0.5.

Figure 8H:
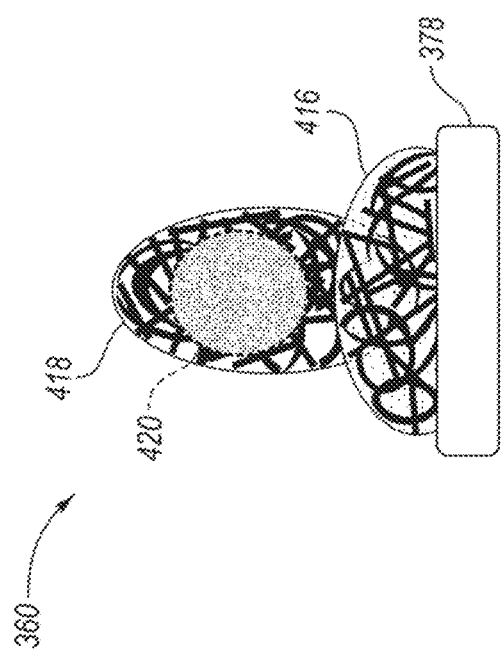

FIG. 8H depicts a schematic, side view of polyelemental catalyst structure 364 supported on catalyst support layer 382. Polyelemental catalyst structure 364 includes region 428, first core region 430 and second core region 432. Region 428 is generally ovular in shape. First core region 430 is generally ovular in shape. Second core region 432 is generally spherical in shape. A portion of region 428 is in direct contact with catalyst support layer 382. Region 428 is configured to support first and second core regions 430 and 432. A portion of region 428 is in interfacial contact with first core region 430. Portions of first core region 430 and second core region 432 are in interfacial contact with each other. Region 428 is formed of a matrix of $M_{II}$ and $M_{III}$ metals. The atomic ratio of $M_{II}$ metal to $M_{III}$ metal in the region 428 may be any of the following values or in a range of any two of the following values: 0.5:1, 0.75:1, 1:1, 1:0.75 and 1:0.5. First core region 430 is formed of a matrix of Pt and $M_{II}$ metal. The atomic ratio of Pt to $M_{II}$ metal in the first core region 430 may be any of the following values or in a range of any two of the following values: 0.5:1, 0.75:1, 1:1, 1:0.75 and 1:0.5. Second core region 432 is formed of a matrix of $M_I$ and $M_{II}$ metals. The atomic ratio of $M_I$ metal to $M_{II}$ metal in the second core region 432 may be any of the following values or in a range of any two of the following values: 0.5:1, 0.75:1, 1:1, 1:0.75 and 1:0.5.

Figure 8I:
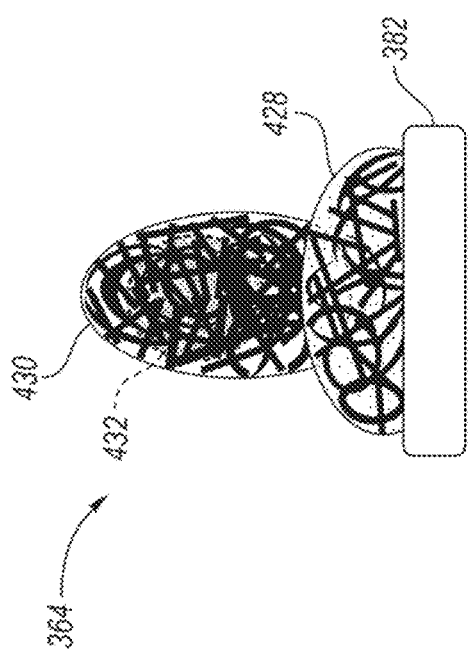

FIG. 8I depicts a schematic, side view of polyelemental catalyst structure 366 supported on catalyst support layer 384. Polyelemental catalyst structure 366 includes region 434, first core region 436 and second core region 438. Region 434 is generally ovular in shape. First core region 436 is generally ovular in shape. Second core region 438 is generally spherical in shape. A portion of region 434 is in direct contact with catalyst support layer 384. Region 434 is configured to support first and second core regions 436 and 438. A portion of region 434 is in interfacial contact with first core region 436. Portions of first core region 436 and second core region 438 are in interfacial contact with each other. Region 434 is formed of a matrix of $M_{II}$ and $M_{III}$ metals. The atomic ratio of $M_{II}$ metal to $M_{III}$ metal in the region 434 may be any of the following values or in a range of any two of the following values: 0.5:1, 0.75:1, 1:1, 1:0.75 and 1:0.5. First core region 436 may be pure Pt. In other embodiments, first core region 436 is made of any of the following values or in a range of any two of the following values of Pt: 90, 91, 92, 93, 94, 95, 96, 97, 98, 99 and 99.5 atomic percent. Second core region 438 is formed of a matrix of $M_I$ and $M_{II}$ metals. The atomic ratio of $M_I$ metal to $M_{II}$ metal in the second core region 438 may be any of the following values or in a range of any two of the following values: 0.5:1, 0.75:1, 1:1, 1:0.75 and 1:0.5.

With respect to the polyelemental catalyst structures shown in FIGS. 8A through 8I, the atomic ratio of material in the region, the first core region and the second core region 390 may be any of the following values or in a range of any two of the following values: 0.01:0.01:0.98, 0.01:0.98:0.01, 0.98:0.01:0.01 and 0.33:0.33:0.33. In certain embodiments, the second core region is partially embedded in the first core region, where a portion of the surface of the second core region is exposed. In other embodiments, the second core region is fully embedded in the first core region, where no portion of the surface of the second core region is exposed.

In one or more embodiments, scanning probe block copolymer lithography (SPBCL) is used to synthesize the polyelemental catalyst structures of one or more embodiments. The SPBCL process uses lithographically defines polymer domes as nanoreactors to synthesize the polyelemental catalyst structures.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A polyelemental catalyst structure comprising:
    a region formed of a first metal material;
    a first core region formed of a second metal material, the first core region having interfacial contact with the region; and
    a second core region formed of a third metal material, the second core region having interfacial contact with the first core region,
    the polyelemental catalyst structure including platinum (Pt), a first metal $M_I$, a second metal $M_{II}$ and a third metal $M_{III}$, the first metal $M_I$ is configured to enhance catalytic activity of Pt, the second metal $M_{II}$ is configured to enhance stability of the polyelemental catalyst structure, and the third metal $M_{III}$ is configured to enhance covalent bonding between Pt, the first metal $M_I$, the second metal $M_{II}$ and/or the third metal $M_{III}$, and the first metal material is a matrix of the second metal $M_{II}$ and the third metal $M_{III}$ the second metal material is a matrix of Pt and the second metal Mu or the third metal material is a matrix of the first metal $M_I$ and the second metal $M_{II}$.

2. The polyelemental catalyst structure of claim 1, wherein the first metal material is the third metal $M_{III}$.

3. The polyelemental catalyst structure of claim 1, wherein the first metal material is the matrix of the second metal $M_{II}$ and the third metal $M_{III}$.

4. The polyelemental catalyst structure of claim 1, wherein the second metal material is platinum (Pt).

5. The polyelemental catalyst structure of claim 1, wherein the second metal material is the matrix of Pt and the second metal $M_{II}$.

6. The polyelemental catalyst structure of claim 1, wherein the third metal material is the matrix of the first metal $M_I$ and the second metal $M_{II}$.

7. The polyelemental catalyst structure of claim 1, wherein the third metal material is the first metal $M_I$.

8. The polyelemental catalyst structure of claim 1, wherein the region is formed of two or more discontinuous subregions.

9. The polyelemental catalyst structure of claim 1, wherein the first metal $M_I$ is selected from the group consisting of: V, Cr, Mn, Fe, Co, Ni, Cu, Y, Zr, Hf and Re.

10. The polyelemental catalyst structure of claim 1, wherein the second metal $M_{II}$ is selected from the group consisting of: Ru, Rh, Pd, Ag, Os, Ir, Au, W, Mo, Ge, Sn, Nb, Ta and Ti.

11. The polyelemental catalyst structure of claim 1, wherein the third metal $M_{III}$ is selected from the group consisting of: Mg, Sc, Y, Zr and Hf.

12. A polyelemental catalyst structure comprising:
    a region formed of a first metal material;
    a first core region formed of pure Pt, the first core region having interfacial contact with the region; and
    a second core region formed of Co, the second core region having interfacial contact with the first core region.

13. The polyelemental catalyst structure of claim 12, wherein the second core region has interfacial contact with the region.

14. The polyelemental catalyst structure of claim 12, wherein the region is formed of two or more discontinuous subregions.

15. A fuel cell comprising:
    a polymer electrolyte membrane (PEM);
    first and second electrode catalyst layers including first and second supports and first and second catalyst materials, respectively, the PEM situated between the first and second electrode catalyst layers, the first and/or second catalyst materials including a plurality of polyelemental catalyst particles, each of the plurality of polyelemental catalyst particles including a region formed of a first metal material, a first core region formed of a second metal material, and a second core region formed of a third metal material, the first core region having interfacial contact with the region, the second core region having interfacial contact with the first core region, the polyelemental catalyst structure including platinum (Pt), a first metal $M_I$, a second metal $M_{II}$ and a third metal $M_{III}$, the first metal $M_I$ is configured to enhance catalytic activity of Pt, the second metal $M_{II}$ is configured to enhance stability of the polyelemental catalyst structure, and the third metal $M_{III}$ is configured to enhance covalent bonding between Pt, the first metal $M_I$, the second metal $M_{II}$ and/or the third metal $M_{III}$, and the first catalyst material includes the plurality of polyelemental catalyst particles and the second catalyst material selected from the group consisting of pure Pt, a Pt—Co alloy, Pt—Ni alloy, and a combination thereof.

16. The fuel cell of claim 15, wherein the first catalyst material includes the plurality of polyelemental catalyst particles, and the region of each of the plurality of polyelemental catalyst particles directly contacts the first support.

17. The fuel cell of claim 15, wherein the second catalyst material includes pure Pt.

18. The fuel cell of claim 15, wherein the second catalyst material includes the Pt—Co alloy.

19. The fuel cell of claim 15, wherein the second catalyst material includes the Pt—Ni alloy.

20. The fuel cell of claim 1, wherein the first metal material is the matrix of the second metal $M_{II}$ and the third metal $M_{III}$, the second metal material is the matrix of Pt and the second metal $M_{II}$, and the third metal material is the matrix of the first metal $M_I$ and the second metal $M_{II}$.

* * * * *